(12) United States Patent
Bawden

(10) Patent No.: US 9,084,716 B1
(45) Date of Patent: Jul. 21, 2015

(54) ENHANCED WATER FOWL DECOY

(71) Applicant: Robert Bawden, West Jordan, UT (US)

(72) Inventor: Robert Bawden, West Jordan, UT (US)

( * ) Notice: Subject to any disclaimer, the term of this patent is extended or adjusted under 35 U.S.C. 154(b) by 135 days.

(21) Appl. No.: 13/622,341

(22) Filed: Sep. 18, 2012

(51) Int. Cl.
*A01M 31/06* (2006.01)

(52) U.S. Cl.
CPC ..................... *A61J 17/001* (2013.01)

(58) Field of Classification Search
USPC .......................................... 43/3, 2
See application file for complete search history.

(56) References Cited

U.S. PATENT DOCUMENTS

| | | | | |
|---|---|---|---|---|
| 231,906 | A * | 9/1880 | Gladwish | 43/3 |
| 403,595 | A * | 5/1889 | Jencks | 43/3 |
| 410,523 | A * | 9/1889 | Jencks | 43/3 |
| 717,790 | A * | 1/1903 | Yorke | 43/3 |
| 1,157,627 | A * | 10/1915 | Koyen et al. | 43/3 |
| 1,468,979 | A * | 9/1923 | Sherman et al. | 43/3 |
| 1,571,213 | A * | 2/1926 | Pitts | 43/3 |
| 1,616,006 | A * | 2/1927 | Sinibaldi | 43/3 |
| 1,813,370 | A * | 7/1931 | Villatore et al. | 43/3 |
| 1,923,442 | A * | 8/1933 | Kilgore | 43/3 |
| 2,185,013 | A * | 12/1939 | Bonetti | 43/3 |
| 2,237,194 | A * | 4/1941 | Ohnmacht | 43/3 |
| 2,267,357 | A * | 12/1941 | Soule | 43/3 |
| 2,274,246 | A * | 2/1942 | Riddell | 43/3 |
| 2,430,645 | A * | 11/1947 | Mills et al. | 43/3 |
| 2,719,376 | A * | 10/1955 | Risch | 43/3 |
| 3,408,763 | A * | 11/1968 | Rudolph | 43/3 |
| 3,927,485 | A * | 12/1975 | Thorsnes, Jr. | 43/3 |
| 3,939,591 | A * | 2/1976 | Schwartztrauber | 43/3 |
| 4,435,913 | A * | 3/1984 | Messina | 43/3 |
| 4,885,861 | A * | 12/1989 | Gazalski | 43/3 |
| 4,890,408 | A * | 1/1990 | Heiges et al. | 43/3 |
| 5,003,718 | A * | 4/1991 | Lenert et al. | 43/3 |
| 5,231,780 | A * | 8/1993 | Gazalski | 43/3 |
| 5,279,063 | A * | 1/1994 | Heiges | 43/3 |
| 5,375,363 | A * | 12/1994 | Higdon | 43/3 |
| 5,613,317 | A * | 3/1997 | Ninegar | 43/3 |
| 6,560,912 | B1 * | 5/2003 | Achepohl | 43/3 |
| 8,291,634 | B2 * | 10/2012 | White | 43/2 |
| 2006/0123688 | A1 * | 6/2006 | Box et al. | 43/3 |

* cited by examiner

*Primary Examiner* — Darren W Ark
(74) *Attorney, Agent, or Firm* — Plager Schack, LLP

(57) ABSTRACT

An enhanced water fowl decoy comprises a head mechanically coupled to a pivot rod, where the pivot rod slides through a swivel barrel. The pivot rod is mechanically coupled to an anchor. The swivel barrel is mechanically coupled to the body; where the head resembles the head of a water fowl and the body resembles the body of the water fowl. In this manner the anchor coordinates movement of the body independent of turning of the head in order to more realistically replicate natural motion of water fowl.

2 Claims, 1 Drawing Sheet

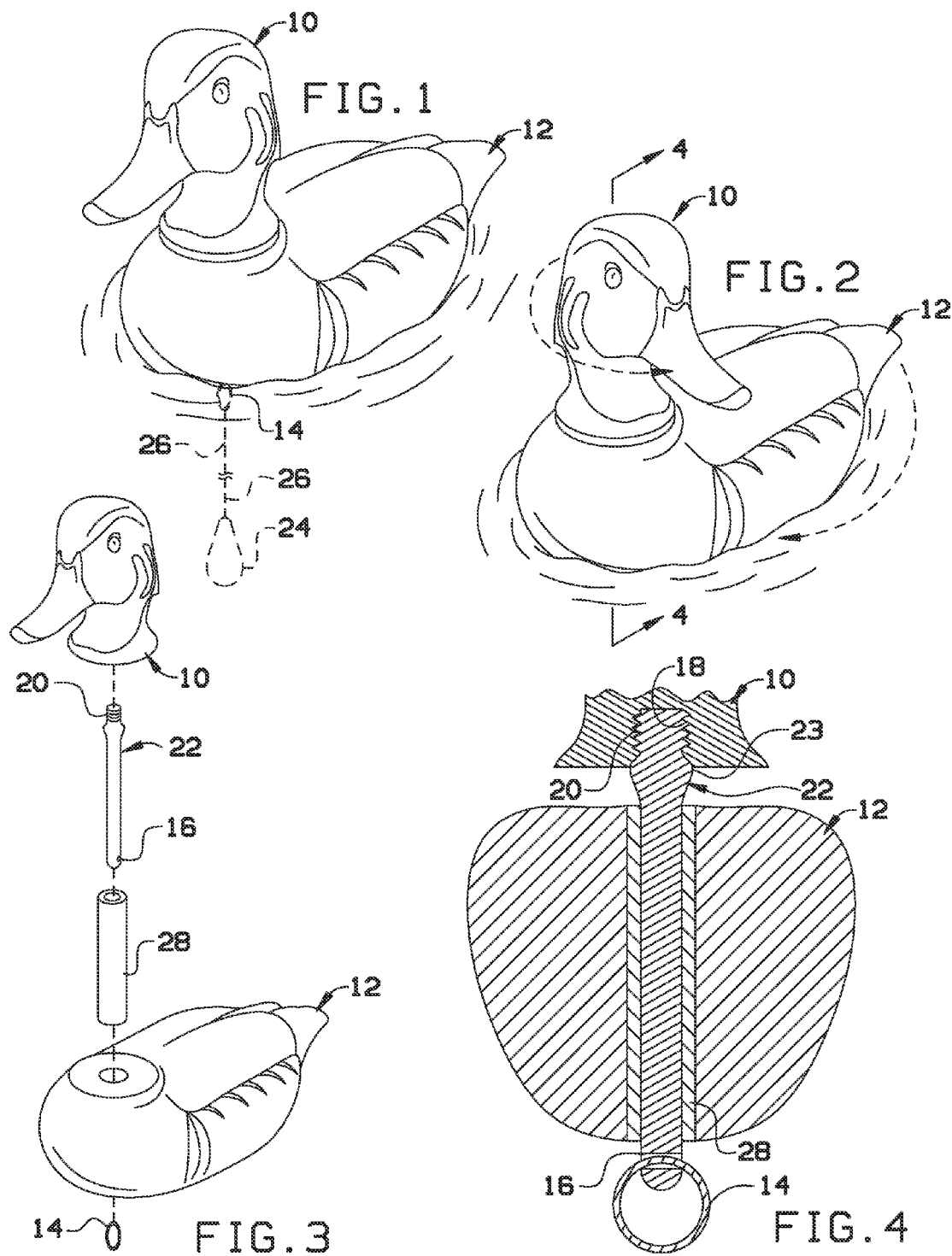

ENHANCED WATER FOWL DECOY

FIELD OF THE INVENTION

This invention relates to devices that attract the attention of game birds.

BACKGROUND OF THE INVENTION

The prior art teaches a series of ways to move water fowl decoys to make the decoy closely resemble water fowl. The shortcomings in the prior art are as follows.

U.S. Pat. No. 5,613,317 issued to Ninegar discloses a movable water fowl decoy head and neck that gesticulates horizontally and vertically as a result of the head and neck being mounted by a large spring. Water fowl do not have heads that bobble like baseball souvenirs, rather the heads rotate a shift from side to side. U.S. Pat. No. 5,279,063 issued to Heiges also teaches a water fowl decoy head and neck that gesticulates horizontally as a result of a first spring at the base of the neck and a second spring at the top of the neck. Again, the spring effect of Heiges emphasizes the baseball souvenir weakness in Ninegar. U.S. Pat. No. 3,927,485 issued to Thorsnes teaches a water fowl decoy where the head and tail move in unison as a result of coordinated levers. Thorsnes replicates the feeding motion (diving for food) of water fowl. This method of luring fowl teaches away from the subtle realistic motion of rest and security in the present device that can lure fowl towards the decoy.

The present invention teaches away from the prior art and includes movement of the head/neck that mimics the live fowls' movements when floating on the water or positioned on land more accurately than the prior art.

BRIEF SUMMARY OF THE INVENTION

An enhanced water fowl decoy comprises a head mechanically coupled to a pivot rod, where the pivot rod slides through a swivel barrel. The pivot rod is mechanically coupled to an anchor. The swivel barrel is mechanically coupled to the body; where the head resembles the head of a water fowl and the body resembles the body of the water fowl. In this manner the anchor coordinates movement of the body independent of turning of the head in order to more realistically replicate natural motion of water fowl.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

FIG. 1 is a perspective view of the invention.

FIG. 2 is a perspective view of the invention demonstrating rotational independent motion of item the head versus the rotational independent motion of the body and omitting anchor components for illustrative clarity.

FIG. 3 is an exploded view of the invention.

FIG. 4 is a section detail view of the invention along line 4-4 in FIG. 1.

DETAILED DESCRIPTION OF THE INVENTION

Embodiments of the present invention overcome many of the obstacles associated with mimicking the movements of water fowl, and now will be described more fully hereinafter with reference to the accompanying drawings that show some, but not all embodiments of the claimed inventions. Indeed, the invention may be embodied in many different forms and should not be construed as limited to the embodiments set forth herein. Rather, these embodiments are provided so that this disclosure will satisfy applicable legal requirements. Like numbers refer to like elements throughout.

FIG. 1 shows the invention in use. Head 10 is immediately adjacent to body 12 as shown in FIG. 3 and FIG. 4, but is not mechanically coupled to FIG. 3 and FIG. 4. Head 10 is mechanically coupled to terminal ring 14 as shown in FIG. 3. Terminal ring 14 is mechanically coupled to anchor line 26, which is further mechanically coupled to anchor 24. Anchor 24 can rest along the ground of a body of water and, when taught allow body 12 to rotate around head 10 in a natural manner.

FIG. 2 shows the natural motion of body 12 around head 10 caused by anchor 14 as noted above. One weakness of the prior art is the inability of the water fowl decoy to move in a natural manner. Hieges and Ninegar do not attempt natural motion of the body independent of the head; rather they are coordinated by springs. Likewise Thorsnes coordinates motion with levers. The present invention teaches that water fowl do not move head 10 and body 12 in a mechanically coordinated manner; rather these movements are more independent. Practical human experience is similar; an individual walking down the street does not move one's head in mechanical coordination with one's body each time. Similarly, water fowl look around in an unpredictable manner while swimming as replicated in the present invention and ignored in the prior art.

FIG. 3 and FIG. 4 show how to make the enhanced water fowl decoy. Head 10 comprises fixed female thread 18. Pivot rod 22 comprises fixed male thread 20 and a truncated conical section 23 configured to lift the head from the body limiting friction between the head 10 and the body 12. In this manner, head 10 can be mechanically coupled to pivot rod 22 by screwing fixed male thread 20 into fixed female thread 18. While any mechanical couple is adequate, this construction ensures easy replacement of parts while allowing coordinated motion of the head and neck that resembles motion of the water fowl. Pivot rod 22 slides through swivel barrel 28 which is immediately adjacent to body 12. Pivot rod 22 further comprises terminal aperture 16 which can accommodate terminal ring 14.

The enhanced water fowl decoy can be made with a variety of materials with a variety of known manners. For example, wood can be used with conventional woodworking techniques, plastic can be used with conventional plastic working techniques and metal can be used with conventional metal working techniques. Regardless of the material chosen, an outer diameter of pivot rod 22 should be about ⅛ of an inch less than the inner diameter of swivel barrel 28 this allows for smooth movement of pivot rod 22 and rotational movement independent of body 12.

That which is claimed:

1. An enhanced water fowl decoy, comprising:
   a head mechanically coupled to a pivot rod; wherein the pivot rod slides through a swivel barrel; the pivot rod is mechanically coupled to an anchor; the swivel barrel is mechanically coupled to a body; wherein the head resembles a head of a water fowl and the body resembles a body of the water fowl;
   wherein the pivot rod further comprises a truncated conical section located between the head and body which is configured to lift the head from the body limiting friction between the head and the body;

wherein the head further comprises a fixed female thread and the pivot rod further comprises a fixed male thread such that the head can be mechanically coupled to the pivot rod by screwing the fixed male thread into the fixed female thread, this construction ensures easy replacement of the head and pivot rod while allowing coordinated motion of the head and neck that resembles motion of the water fowl;

in this manner the anchor coordinates the movement of the body independent of the turning of the head in order to more realistically replicate natural motion of the water fowl.

2. The enhanced water fowl decoy of claim 1, an outer diameter of the pivot rod is about ⅛ of an inch less than an inner diameter of the swivel barrel; this allows for smooth movement of the pivot rod and rotational movement of the head independent of the body.

* * * * *